United States Patent
Lappalainen et al.

(10) Patent No.: US 7,796,651 B2
(45) Date of Patent: Sep. 14, 2010

(54) SEE WHAT YOU SEE (SWYS)

(75) Inventors: Kristian Lappalainen, Oulu (FI); Markku Heiskala, Oulu (FI)

(73) Assignee: Nokia Corporation, Espoo (FI)

( * ) Notice: Subject to any disclaimer, the term of this patent is extended or adjusted under 35 U.S.C. 154(b) by 972 days.

(21) Appl. No.: 11/071,530

(22) Filed: Mar. 2, 2005

(65) Prior Publication Data

US 2006/0198395 A1 Sep. 7, 2006

(51) Int. Cl.
 H04J 3/06 (2006.01)
(52) U.S. Cl. ...................................... 370/503
(58) Field of Classification Search ................ 375/222; 709/200; 714/748; 370/503
 See application file for complete search history.

(56) References Cited

U.S. PATENT DOCUMENTS

| | | | | |
|---|---|---|---|---|
| 6,032,180 | A * | 2/2000 | Nishikawa | 725/115 |
| 6,587,985 | B1 * | 7/2003 | Fukushima et al. | 714/748 |
| 7,657,829 | B2 * | 2/2010 | Panabaker et al. | 715/203 |
| 2002/0053053 | A1 | 5/2002 | Nagai et al. | |
| 2002/0176361 | A1 | 11/2002 | Wu et al. | |
| 2003/0046384 | A1 * | 3/2003 | Sirivara et al. | 709/224 |
| 2003/0081664 | A1 * | 5/2003 | Lu et al. | 375/222 |
| 2004/0072569 | A1 * | 4/2004 | Omae et al. | 455/445 |
| 2004/0186877 | A1 * | 9/2004 | Wang et al. | 709/200 |
| 2005/0135326 | A1 * | 6/2005 | Rashid et al. | 370/346 |
| 2005/0286546 | A1 * | 12/2005 | Bassoli et al. | 370/432 |

FOREIGN PATENT DOCUMENTS

| | | |
|---|---|---|
| CN | 1489356 | 4/2004 |
| EP | 1057337 | 4/2003 |
| EP | 1057337 B1 * | 4/2003 |

\* cited by examiner

*Primary Examiner*—Chirag G Shah
*Assistant Examiner*—Otis L Thompson, Jr.
(74) *Attorney, Agent, or Firm*—Alfred A. Fressola; Ware, Fressola, Van Der Sluys & Adolphson LLP

(57) ABSTRACT

This invention relates to a transmission of a media from a sending terminal to a receiving terminal. In a method for sending media from a sending terminal to a receiving terminal, at least part of the media is transmitted to the receiving terminal as a sequence of data packets and stored in the sending terminal, so that as a response to received data packets, notifications are returned from the receiving terminal, whereupon according to the notifications a presentation of the stored transmitted media is formed in the sending terminal. The invention relates also to a system, to a device, and to a computer program product.

15 Claims, 5 Drawing Sheets

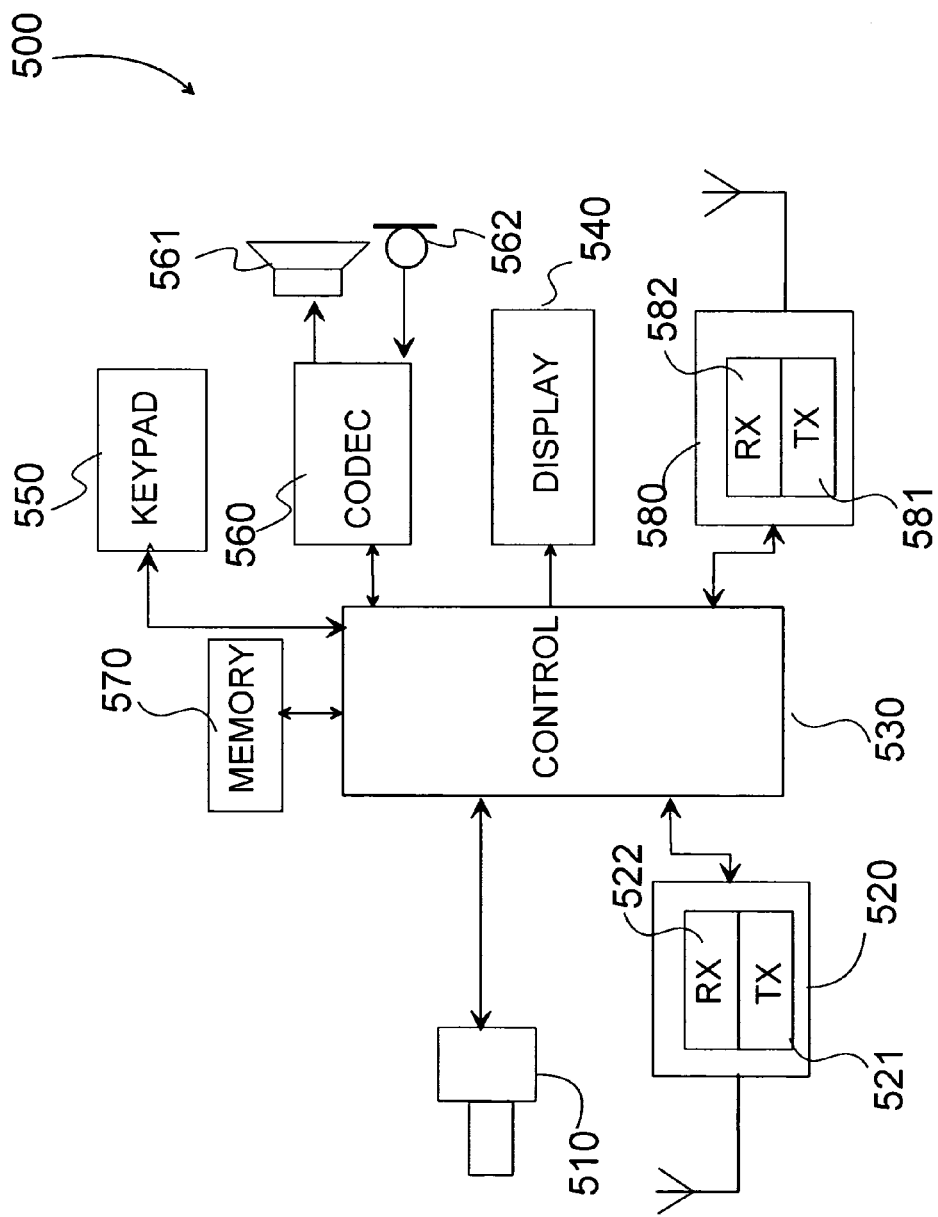

SEE WHAT YOU SEE (SWYS)

FIELD OF THE INVENTION

This invention relates to transmission of a media from a sending terminal to a receiving terminal.

BACKGROUND OF THE INVENTION

See What I See (SWIS) is a modern way of communicating via a mobile network. In SWIS, the communication comprises typically both audio and video. The basic idea of SWIS is to make a phone call and to simultaneously send real time video data describing the environment from which the phone call is made. This means that the receiver can view the video of the environment and the situation from which the sender is making the phone call.

SWIS can be implemented in different ways. The audio can be transmitted over circuit-switched network and the video over packet-switched network. It is also possible to transmit both over the packet-switched network (e.g. VoIP). In circuit-switched (CS) network digital data is sent as a continuous stream of bits, whereby there is not hardly any delay in the transmission, or the delay is substantially constant. In packet-switched (PS) network digital data is sent by forming data into short packets, which are transmitted. The packet-switched network can have unpredictable delays or packets may be even lost, whereby the sender cannot be sure when the data packet is received at the receiver.

Currently, data that is carried over packet-switched network is handled by using Real-time Transfer Protocol (RTP). RTP Control Protocol (RTCP) is based on the periodic transmission of control packets to all participants in a session. The primary function of RTCP is to provide feedback on the quality of the data distribution. This feedback is performed by sender and receiver reports.

The sender report (SR) comprises a synchronization source identifier (SSRC) for the sender of the SR in question. In SR there is a NTP timestamp, which indicates the time when the SR report was sent. RTP timestamp corresponds to the same time as the NTP timestamp, but in the same units and with the same random offset as the RTP timestamps in data packets. SR also comprises information about sender's packet count, which is the total number of RTP data packets transmitted by the sender since starting transmission up until the time the current SR was generated. Sender's octet count in SR tells the total number of payload octets transmitted in RTP data packets by the sender since starting transmission up until the time the current SR was generated.

The receiver report (RR) also comprises a source identifier (SSRC_n) to which the information in the receiver report pertains. RR also comprises fraction lost, which describes the fraction of RTP data packets from source SSRC_n lost since the previous SR or RR packet was sent. This fraction is defined to be the number of packets lost and that divided by the number of packets expected. A cumulative number of packets lost in RR is the total number of RTP data packets from source SSRC_n that have been lost since the beginning of reception. This number is defined to be the number of packets expected minus number of packets actually received, where the number of packets received includes any which are late or duplicates. The number of packets expected is defined to be the extended highest sequence number received, that contain the highest sequence number received in an RTP data packet from source SSRC_n, and the sequence number with the corresponding count of sequence number cycles. RR also comprises interarrival jitter, which is an estimate of the statistical variance of the RTP data packet interarrival time. Also RR comprises last SR timestamp and delay since last SR (DLSR), which is the delay between receiving the last SR packet from source SSRC_n and sending the current reception report block. If no SR packet has been received yet from SSRC_n, the DLSR field is set to zero.

The problem with SWIS and with packet-switched network is due to the unpredictable delays, whereby the sender cannot be sure of the accurate time when the media packet is received by the receiver. In the context of video, the sender cannot thus know, what part of the sent media is visible at the receiver at a given time. Therefore, in SWIS the user's speech might be received significantly earlier than the video, whereby the recipient does not necessarily know, about what the sender is talking about if the sender is referring to something shown in the video transmission.

Synchronization methods for audio and images used e.g. in video conferencing can be found from related art. Mainly these methods relate to so called "lip synchronization". In EP1057337 B1 sound and images are synchronized in real-time multimedia communication by detecting any mismatch between the sound and image outputs and adjusting a variable delay in a gateway on a signal routed through said gateway until the sound and image outputs are synchronized.

However, in SWIS the problems relate more to the fact that the sender is not aware exactly what part or phase of the media the receiver is currently receiving and observing. Therefore, there is still clear need to provide improvements in this kind of communication to improve the overall information exchange and mutual understanding between the human sender and receiver parties.

SUMMARY OF THE INVENTION

This invention is targeted to such an improvement by providing a method, a system, a device and a computer program product for communicating media between terminals.

In the method for sending media from a sending terminal to a receiving terminal, at least part of said media is transmitted to the receiving terminal as a sequence of data packets and stored in the sending terminal, so that as a response to received data packets, notifications are returned from said receiving terminal, whereupon according to said notifications a presentation of the stored transmitted media is formed in the sending terminal.

In the system for sending media from a sending terminal to a receiving terminal, said sending terminal is capable of transmitting at least part of said media as a sequence of data packets and storing said transmitted media, so that as a response to received data packets the receiving terminal is capable of returning notifications, whereupon the system is configured to form a presentation of the stored transmitted media according to said notifications in said sending terminal.

The device for sending media having at least one data transfer connection to a receiving terminal, is capable of transmitting at least part of said media as a sequence of data packets to said receiving terminal and storing said transmitted media, and further capable of receiving notifications from the receiving terminal in response to transmitted data packets, whereupon the device is capable of forming a presentation of the stored transmitted media according to said notifications.

The computer program product that is stored on a medium and that is arranged for sending media comprises computer readable instructions for transmitting at least part of said media as a sequence of data packets and storing said transmitted media, receiving as a response to transmitted data packets notifications, whereupon according to said notifications forming a presentation of the stored transmitted media.

And further, the computer program for sending media comprises computer readable instructions for transmitting at least part of said as a sequence of data packets and storing said transmitted media, receiving as a response to transmitted data packets notifications, whereupon according to said notifications forming a presentation of the stored transmitted media.

According to the solution it is possible for the sender to be aware of what phase or part of the sent media the receiver is receiving.

The gist of the invention is to provide the sender a possibility to view in his/hers sending device the same view that the recipient is receiving in his/her receiving device in a temporally synchronized manner. In other words, the sender will then see what the receiving side is seeing at a given time. This makes it possible for the sending human part to tailor, if necessary, his/hers speech to the other presentation that might have transmission delays due to the packet-switched transmission means.

In the following this principle according to the invention is called See What You See (SWYS).

DESCRIPTION OF THE DRAWINGS

A better understanding of the invention may be obtained from the following considerations taken in conjunction with the accompanying drawings, wherein FIG. 5 illustrates an example of the device for sending media content.

DETAILED DESCRIPTION OF THE INVENTION

Figure 1:
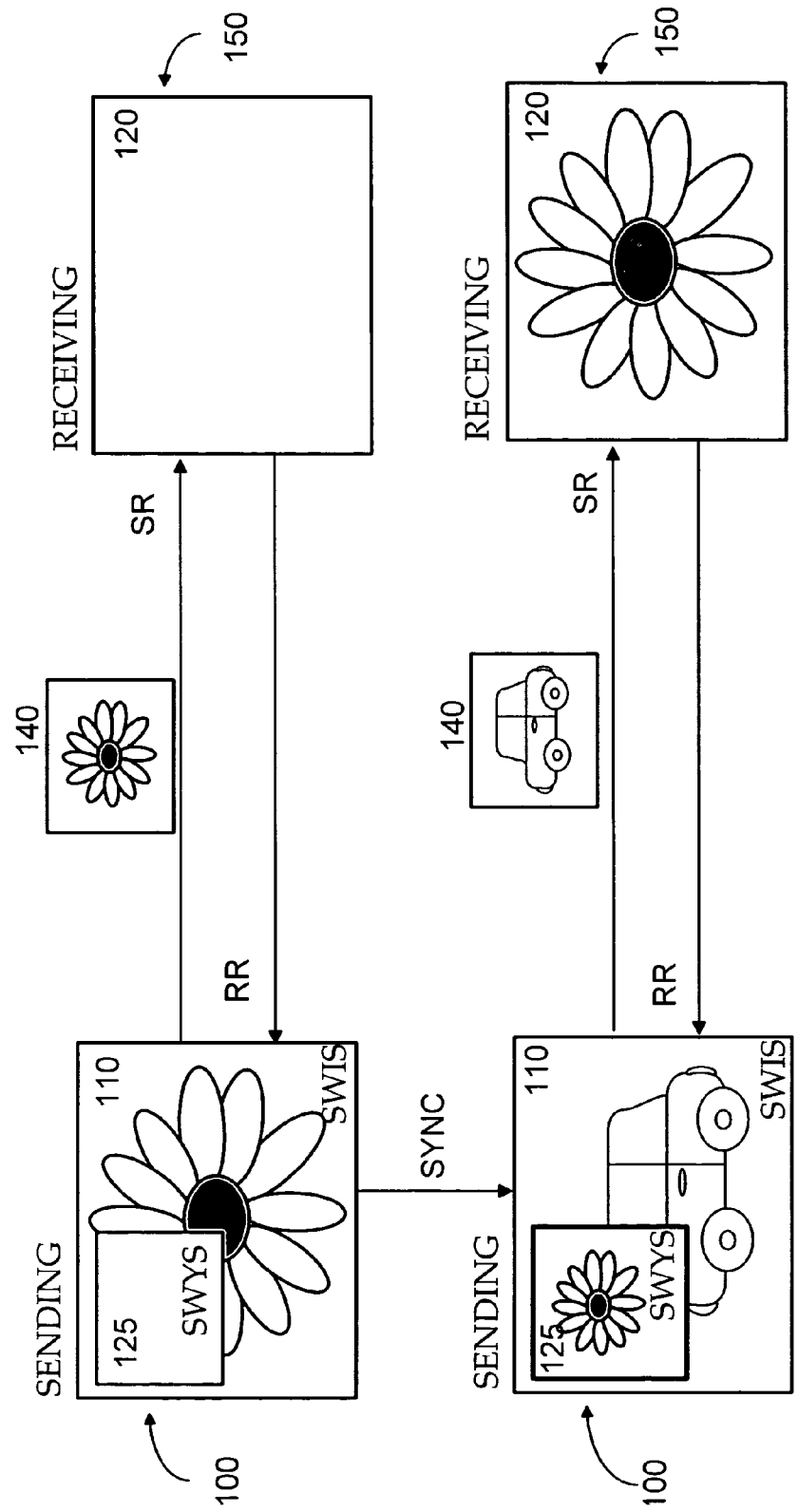
FIG. 1 illustrates in a very simplified manner an example of steps of the invention.

Although specific terms are used in the following description for the sake of clarity, these terms are intended to refer only to selected examples of the invention illustrated in the drawings and are not necessarily intended to define or limit the scope of the invention. Because the invention is operating with displays of at least two users, the more specific definition for the displays is given. Notable elements relating to the implementation of the invention are a sending terminal and at least one receiving terminal. These terminals comprise a sending display and a receiving display, respectively. The sending display is arranged to show a SWIS view, which is the one the user is sending, and a SWYS view, which is the one the receiver is receiving and seeing. Another way to refer to these displays is to use terms local viewfinder view (SWIS) and a remote viewfinder view (SWYS). Typically, the sender uses the local viewfinder view to select the scene that he/she wants to show the other party. Using the remote viewfinder view the sender can check what the other party is seeing at a given time and if necessary, for example, due to transmission delays, accommodate his/hers presentation to this situation.

The SWIS view and the SWYS view can share the sending display, whereby a part of the sending display is designated for SWIS view and a part of the sending display is designated for SWYS view. In some situations it is also possible to show said views on the sending display as a whole, whereby transposition between said views can be done by some interaction operation. This and other operations are discussed hereafter. In the description term "media" is used as an example of the sendable data. Particularly the media relates to audio and video, but other imaging data can be transmitted as well. Sometimes media may comprise only imaging data. In the description term "presentation" relates to such a form of transmitted media that is displayed on a SWYS view.

In FIG. 1 a very simplified example of the invention is illustrated. The sending display 100 comprises views for SWIS 110 and SWYS 125. The receiving display 150 also comprises a view 120. Naturally the view 120 can be arranged similarly for SWIS and SWYS at the receiving terminal. However, for understanding purposes the view 120 is discussed as such. The content for SWIS view 110 is acquired from imaging means (not shown in FIG. 1) arranged to the device in question. The content is media content, e.g. video or still images. Media content should be understood here in a broad sense. Such content may be from a camera device integrated in the sender device, but also from any other source with or connected to the sending device, for example, from media files recorded earlier or other visual or audible data, such as text files or slide shows or music files. Therefore, this invention is not limited to videophone applications, but applies to broad range of applications where the parties are presenting media content with each other in a real time manner.

The content is transmitted to the receiving device by dividing content data into packets 140, which packet 140 is then transmitted. Along with the packet 140 also a sending report (SR) is transmitted to the receiving terminal. The sending report (SR) comprises at least an identification for the packet and sending time for the packet in question. The packet combination also comprises receiving notification, i.e. receiving report (RR) that is returned at the time receiving terminal has received the packet 140. At the sending terminal the receiving notification (RR) is examined and information about state of the transmitted packet is looked for. According to said information a presentation to be displayed on the SWYS view 125 is formed by synchronizing the transmitted media packet with a content of the view 120 of receiving display 150, whereby the presentation is shown in SWYS view 125. Therefore the SWYS view 125 displays substantially the same content as the receiving display 150. It should be noticed that at this point, the content of the SWIS view 110, the local viewfinder view, may already have been changed.

Figure 2:
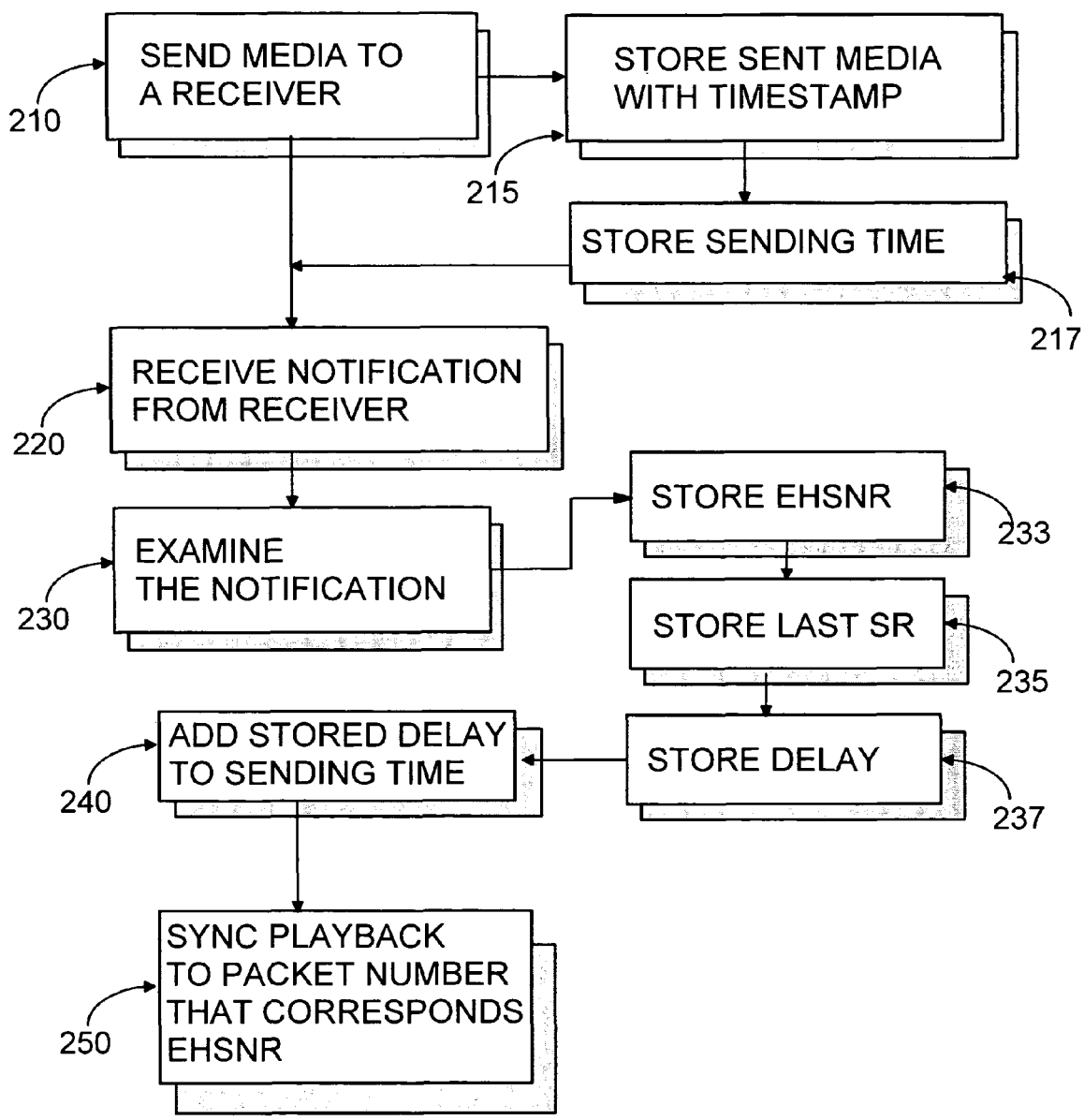
FIG. 2 illustrates a flow chart of the method steps according to one example of the invention.

The synchronization is discussed in more detailed manner with reference to FIG. 2, wherein an example of process steps is shown. The process steps illustrated in FIG. 2 relate to actions occurring in the sending terminal. At first (210) the sending terminal sends media to a receiving terminal. The media is packed and transmitted by utilizing e.g. RTP over UDP/IP (User Datagram Protocol/Internet Protocol). In addition to media packet also a sending report is transmitted to the recipient. The sending report may be in the form of RTCP SR report, when RTCP is used as controlling protocol. At the time the packet is sent, the sending terminal stores (215) the sent media with timestamp. For example, when video is sent, the video frames composing said video are stored with a system clock time stamp to buffer. The length of the buffer may be fixed, whereby first stored sent media is also first removed (i.e. first in, first out). In addition the sending terminal stores (217) sending time of the last sent packet. When the packet has been delivered to the receiving terminal the sending terminal receives (220) a notification. Notifications are returned by the receiving terminal as a response to received data packets. The notification can be in the form of an RTCP RR report. When the notifications are received by the sending terminal, the sending terminal examines (230) the content of said notification. The interest of the examination is targeted to the number of packets expected by the recipient from the sending terminal, which can be checked from EHSNR (extended highest sequence number received) field in the RR report. Another interesting examination target is the last sending report field, wherefrom information about the time of last SR can be found. Yet another interesting examination target is the delay since last sending report, which is the delay between receiving the last SR packet from sending terminal and sending the current reception report. This information is stored (233, 235, 237) to the sending terminal.

To be able to form a presentation of the transmitted media to be played on the SWYS view of the sending terminal in correct time, the sending terminal is configured to calculate how much time it took from the media to reach receiving terminal. This is determined by the time of the last SR information being stored from the notification. The stored delay information (stored at step 237) is added to the sending time of the last sent packet being stored at step 217, whereby synchronization information is determined. By means of said synchronization information the playback is synchronized to the packet number that corresponds with the EHSNR information (stored at step 233).

Figure 3A:
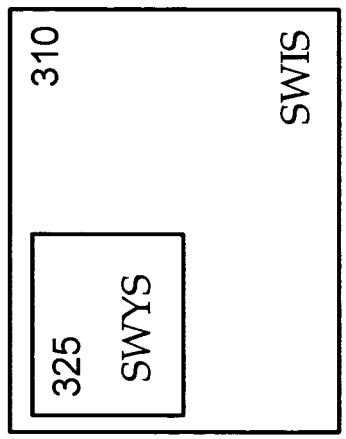
FIGS. 3a and 3b illustrate an example of the SWIS and SWYS views in relation to each other.
Figure 3B:
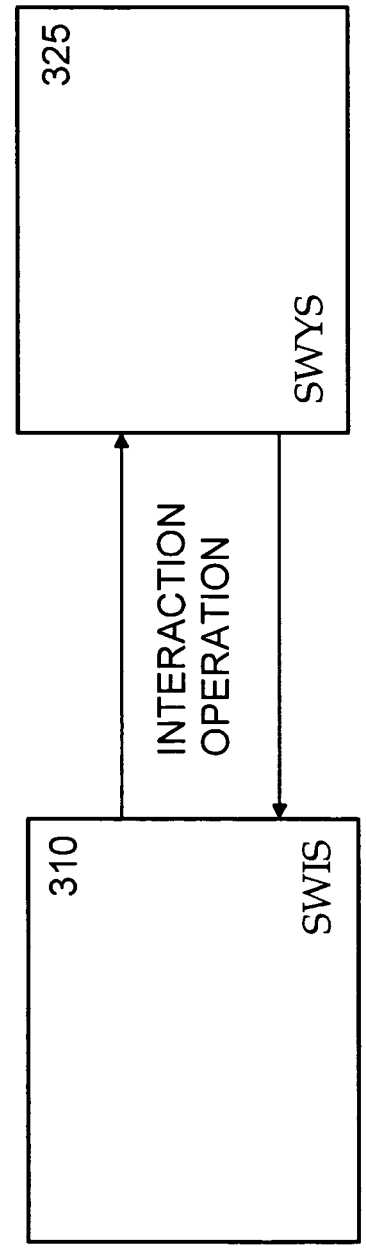

After the synchronization the presentation of the media is formed and can be displayed on the SWYS view. There are at least two different possibilities to show the views to the user of the sending terminal. These possibilities are illustrated in FIG. 3a, 3b. FIG. 3a illustrates a similar situation to FIG. 1, wherein part of the display is designated for the SWIS view 110 and other part for the SWYS view 125. In FIG. 3b, both of the views 110, 125 are displayed on substantially the entire viewing area of the display. The switch from the SWIS view 110 to the SWYS view 125 can be a result of a known interaction operation. As an example of known interaction operations are menu action, keyboard shortcut, and touch.

SWIS session can begin during a general (circuit-switched or packet-switched) call that the users are having by transmitting image data to the receiving terminal. The image data can be transmitted substantially at the same time the imaging device is capturing it, or the image data can already be captured, stored to memory means and acquired from there. In the latter situation the stored image data can also comprise audio (captured with image data), whereby the sending terminal may choose whether the audio is transmitted along or not. If not, the audio is removed from the transmission. Furthermore it is possible to transmit audio that is a mixture of speech and captured audio. This makes it possible for the sender to comment on the presentation in real time manner.

Figure 4:
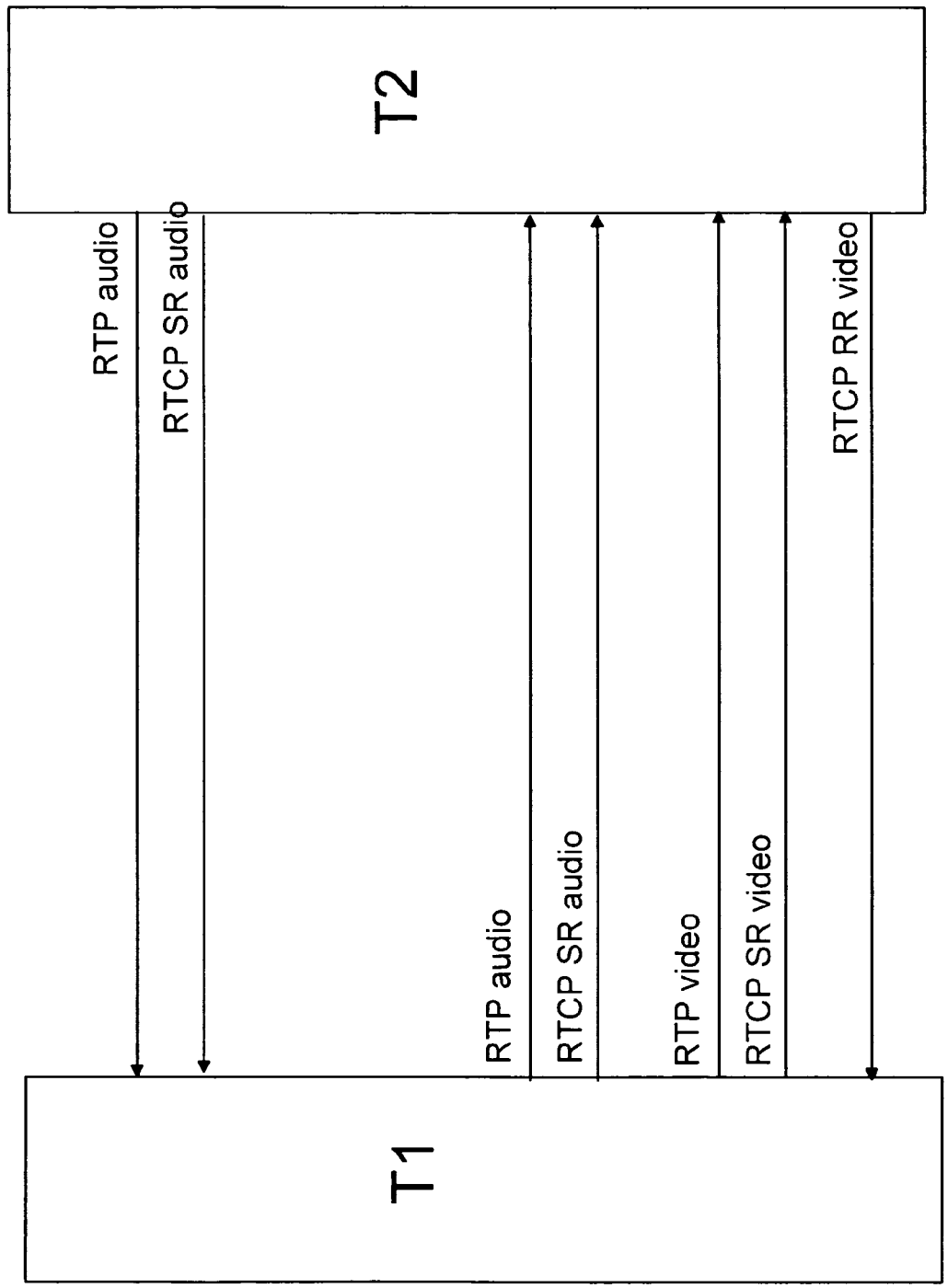
FIG. 4 illustrates an example of signaling between two terminals.

One example of signalling between two terminals T1, T2 is illustrated in FIG. 4. The terminals T1, T2 are having a call session, e.g. by VoIP. The "RTP audio" and "RTCP SR audio" illustrates audio packets being sent between terminals T1 and T2. Terminal T1 begins a SWIS session by sending a sequence of video packets (RTP video, RTCP SR video) to receiving terminal T2. After receiving a video packet the receiving terminal returns a video response report (RTCP RR video) according to which the synchronization (as stated above) can be made.

The sending terminal is an electronic communication device that is operatively communicating with the imaging means. One example of such a device is an imaging phone (see FIG. 5), however systems comprising at least a communication capable device and e.g. a web cam or a digital camera can utilize the solution of this description. The device 500 comprises optics 510 or other means that can communicate with the optics for capturing imaging data. The device 500 can also comprise a communication means 520 having a transmitter 521 and a receiver 522 or be connected to such. There can also be other communicating means 580 having a transmitter 581 and a receiver 582 as well. The first communicating means 520 can be adapted for telecommunication and the other communicating means 580 can be a kind of short-range communicating means, such as a Bluetooth™ system, a WLAN system (Wireless Local Area Network) or other system which suits local use and for communicating with another device. The device 500 according to the FIG. 5 also comprises a display 540 for displaying visual information and the imaging data being acquired. In addition the device 500 may comprise an interaction means, such as a keypad 550 for inputting data etc. In addition or instead of the keypad 550, the device can comprises stylus, whether the display is a touch-screen display. The device 500 can also comprise audio means 560, such as an earphone 561 and a microphone 562 and optionally a codec for coding (and decoding, if needed) the audio information. The device 500 also comprises a control unit 530 for controlling functions and running applications in the device 500. The control unit 530 may comprise one or more processors (CPU, DSP). The device further comprises memory 570 for storing e.g. data, applications, and computer program code.

The foregoing detailed description is provided for clearness of understanding only, and not necessarily limitation should be read therefrom into the claims herein.

What is claimed is:

1. A method comprising:
transmitting at least a part of media to a receiving terminal as data packets and also storing said part in a sending terminal during a call session;
receiving, in response to said transmitted data packets, notifications from said receiving terminal;
determining synchronization data by determining last information received by the receiving terminal on the basis of the notifications and by determining a delay related to said last information;
forming a presentation of said stored part by adding the delay to a sending time of a stored data packet of said stored part in the sending terminal; and
playing said presentation in the sending terminal during said call session in order to be synchronized with the receiving terminal.

2. The method according to claim 1, the method further comprising:
forming said presentation by temporally synchronizing said stored part according to time stamps in said notifications.

3. The method according to claim 1, further comprising:
playing said presentation on a small part of a display of the sending terminal.

4. The method according to claim 1, further comprising:
transmitting a sequence of data packets by utilizing packet-switched protocols.

5. The method according to claim 1, wherein said notifications comprise sequence numbers and said data packets comprise packet numbers, the method further comprising:
synchronizing said presentation according to the packet number
corresponding with the highest sequence number received.

6. A system comprising:
a sending terminal and a receiving terminal;
the sending terminal configured to transmit at least a part of media as data packets to the receiving terminal during a call session between the sending terminal and the receiving terminal, and also storing said part;

the receiving terminal, configured to return notifications to said sending terminal in response to said transmitted data packets;

the system configured to determine synchronization data by determining the last information received by the receiving terminal on the basis of the notifications and to determine a delay related to said last information; and to form in said sending terminal a presentation of the stored part by adding the delay to a sending time of a stored data packet of said stored part; and wherein the sending terminal is configured to play said presentation during said call session in order to be synchronized with the receiving terminal.

7. The system according to claim 6, wherein said system is configured to play said presentation on a small part of a display of the sending terminal.

8. An apparatus comprising:

at least one data transfer connection to a receiving terminal;

a transmitter configured to transmit at least a part of media as data packets to said receiving terminal during a call session between a sending terminal and the receiving terminal, and also to store said part;

a receiver configured to receive notifications from the receiving terminal in response to said data packets; and a control unit configured to determine synchronization data by determining last information received by the receiving terminal on the basis of the notifications and to determine a delay related to said last information and to form a presentation of the stored part by adding the delay to a sending time of a stored data packet of said stored part; and a display configured to play said presentation in the sending terminal during said call session in order to be synchronized with the receiving terminal.

9. The apparatus according to claim 8, wherein the device is configured to form said presentation by temporally synchronizing the stored part according to time stamps in said notifications.

10. The apparatus according to claim 8, wherein the device is configured to play said presentation on a small part of the display.

11. The apparatus according to claim 8, wherein said notifications comprise sequence numbers and said data packets comprise packet numbers, wherein the device is configured to synchronize the presentation according to the packet number corresponding with the highest sequence number received.

12. The apparatus according to claim 8, comprising an imager for capturing said media.

13. The device apparatus according to claim 8, comprising means for telecommunications.

14. A non-transitory computer readable medium stored with instructions, which when executed by a processor comprised in an apparatus, cause said apparatus to perform:

transmitting at least a part of said media as data packets to a receiving terminal during a call session between a sending terminal and the receiving terminal and also storing said part;

receiving notifications in response to said transmitted data packets;

determining synchronization data by determining the last information received by the receiving terminal on the basis of the notifications and by determining a delay related to said last information;

forming a presentation of the stored part by adding the delay related to said last information to a sending time of a stored data packet of said stored part; and playing said presentation in the sending terminal during said call session in order to be synchronized with the receiving terminal.

15. An apparatus comprising:

means for transmitting at least part of media as data packets to a receiving terminal during a call session between a sending terminal and a receiving terminal and storing said transmitted media;

means for receiving notifications from the receiving terminal in response to transmitted data packets;

means for determining synchronization data by determining last information on the basis of the notifications;

means for determining a delay related to said last information;

means for forming a presentation of the stored part of transmitted media by adding the delay to a sending time of a stored data packet of said stored part; and means for playing said presentation in the sending terminal during said call session in order to be synchronized with the receiving terminal.

* * * * *